US008832116B1

(12) United States Patent
Chu et al.

(10) Patent No.: US 8,832,116 B1
(45) Date of Patent: Sep. 9, 2014

(54) USING MOBILE APPLICATION LOGS TO MEASURE AND MAINTAIN ACCURACY OF BUSINESS INFORMATION

(75) Inventors: Fang Chu, Beijing (CN); Bo Zheng, Beijing (CN); Gang Feng, Beijing (CN); Dylan Myers, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/348,563

(22) Filed: Jan. 11, 2012

(51) Int. Cl.
    *G06F 17/30* (2006.01)
(52) U.S. Cl.
    USPC .......................................... 707/748; 707/781
(58) Field of Classification Search
    USPC .......................................... 707/748, 784, 781
    See application file for complete search history.

(56) References Cited

U.S. PATENT DOCUMENTS

| | | | |
|---|---|---|---|
| 6,456,622 B1 | 9/2002 | Skaanning et al. | |
| 6,631,362 B1 | 10/2003 | Ullman et al. | |
| 6,853,905 B2 | 2/2005 | Barton | |
| 7,117,199 B2 | 10/2006 | Frank et al. | |
| 7,263,506 B2 | 8/2007 | Lee et al. | |
| 7,440,875 B2 | 10/2008 | Cuthbert et al. | |
| 7,519,562 B1 | 4/2009 | Vander Mey et al. | |
| 7,525,484 B2 | 4/2009 | Dupray et al. | |
| 7,764,231 B1 | 7/2010 | Karr et al. | |
| 7,788,030 B2 | 8/2010 | Kato et al. | |
| 7,822,631 B1 * | 10/2010 | Vander Mey et al. | 705/7.29 |
| 8,015,183 B2 | 9/2011 | Frank | |
| 8,019,641 B2 | 9/2011 | Foroutan | |
| 8,103,445 B2 | 1/2012 | Smith et al. | |
| 8,112,802 B2 | 2/2012 | Hadjieleftheriou et al. | |
| 8,185,448 B1 | 5/2012 | Myslinski | |
| 8,190,546 B2 | 5/2012 | Dong et al. | |
| 8,229,795 B1 | 7/2012 | Myslinski | |
| 8,321,295 B1 | 11/2012 | Myslinski | |
| 8,370,340 B1 | 2/2013 | Yu et al. | |
| 8,396,840 B1 | 3/2013 | McHugh et al. | |
| 8,533,146 B1 | 9/2013 | Kulshreshtha et al. | |
| 2002/0156917 A1 | 10/2002 | Nye | |
| 2003/0046098 A1 | 3/2003 | Kim | |
| 2003/0195793 A1 | 10/2003 | Jain et al. | |
| 2003/0200543 A1 | 10/2003 | Burns | |
| 2003/0225652 A1 | 12/2003 | Minow et al. | |
| 2006/0106535 A1 | 5/2006 | Duncan et al. | |
| 2006/0155501 A1 | 7/2006 | Hempel | |

(Continued)

FOREIGN PATENT DOCUMENTS

WO    WO 2011/127659 A1    10/2011

OTHER PUBLICATIONS

Marriott, A., "Scalable Geospatial Object Database Systems," 2006, pp. 1-22.

(Continued)

*Primary Examiner* — Cam Truong
(74) *Attorney, Agent, or Firm* — Fenwick & West LLP

(57) ABSTRACT

Business information about business entities are received from a plurality of aggregate information sources such as business directories. Mobile application logs about user activities are received from a plurality of mobile devices. Business entities related to the user activities are identified based on the mobile application logs. Scored attributes about the related business entities are acquired by applying data analysis rules to the mobile application logs. Accuracy scores are determined for attribute values in the business information based on the acquired scored attributes. Updated business information for the business entities is generated based on the accuracy scores and outputted to users upon request.

14 Claims, 4 Drawing Sheets

(56) References Cited

U.S. PATENT DOCUMENTS

| | | | |
|---|---|---|---|
| 2006/0212931 A1 | 9/2006 | Shull et al. | |
| 2006/0253584 A1 | 11/2006 | Dixon et al. | |
| 2007/0072585 A1* | 3/2007 | Johnson et al. | 455/405 |
| 2007/0121596 A1* | 5/2007 | Kurapati et al. | 370/356 |
| 2007/0210937 A1 | 9/2007 | Smith et al. | |
| 2007/0273558 A1 | 11/2007 | Smith et al. | |
| 2008/0010262 A1 | 1/2008 | Frank | |
| 2008/0010273 A1 | 1/2008 | Frank | |
| 2008/0010605 A1 | 1/2008 | Frank | |
| 2008/0026360 A1 | 1/2008 | Hull | |
| 2008/0046334 A1 | 2/2008 | Lee et al. | |
| 2008/0104180 A1 | 5/2008 | Gabe | |
| 2008/0208849 A1 | 8/2008 | Conwell | |
| 2009/0024589 A1* | 1/2009 | Sood et al. | 707/3 |
| 2009/0043786 A1* | 2/2009 | Schmidt et al. | 707/100 |
| 2009/0112474 A1 | 4/2009 | Chakrapani et al. | |
| 2009/0157667 A1 | 6/2009 | Brougher et al. | |
| 2009/0182780 A1* | 7/2009 | Wong et al. | 707/200 |
| 2009/0257621 A1 | 10/2009 | Silver | |
| 2009/0265198 A1 | 10/2009 | Lester et al. | |
| 2010/0017348 A1 | 1/2010 | Pinckney et al. | |
| 2010/0023259 A1 | 1/2010 | Krumm et al. | |
| 2010/0030578 A1 | 2/2010 | Siddique et al. | |
| 2010/0070930 A1* | 3/2010 | Thibault | 715/854 |
| 2010/0131499 A1 | 5/2010 | Van Leuken et al. | |
| 2010/0153324 A1 | 6/2010 | Downs et al. | |
| 2010/0153451 A1* | 6/2010 | Delia et al. | 707/781 |
| 2010/0325179 A1 | 12/2010 | Tranter | |
| 2010/0332118 A1 | 12/2010 | Geelen et al. | |
| 2010/0332119 A1 | 12/2010 | Geelen et al. | |
| 2011/0040691 A1 | 2/2011 | Martinez et al. | |
| 2011/0072034 A1 | 3/2011 | Sly et al. | |
| 2011/0122153 A1 | 5/2011 | Okamura et al. | |
| 2011/0131172 A1 | 6/2011 | Herzog et al. | |
| 2011/0185401 A1 | 7/2011 | Bak et al. | |
| 2011/0208702 A1 | 8/2011 | Minde et al. | |
| 2011/0238735 A1 | 9/2011 | Gharpure et al. | |
| 2012/0023057 A1 | 1/2012 | Winberry et al. | |
| 2012/0046860 A1 | 2/2012 | Curtis et al. | |
| 2012/0110006 A9* | 5/2012 | Lubarski et al. | 707/769 |
| 2012/0124057 A1 | 5/2012 | Daoud et al. | |
| 2012/0137367 A1 | 5/2012 | Dupont et al. | |
| 2012/0191357 A1 | 7/2012 | Qiu et al. | |
| 2012/0197979 A1 | 8/2012 | Palm et al. | |
| 2012/0278321 A1 | 11/2012 | Traub et al. | |
| 2012/0317046 A1 | 12/2012 | Myslinski | |
| 2012/0317593 A1 | 12/2012 | Myslinski | |
| 2012/0323842 A1 | 12/2012 | Izhikevich et al. | |
| 2012/0326984 A1 | 12/2012 | Ghassabian | |
| 2013/0031574 A1 | 1/2013 | Myslinski | |
| 2013/0110839 A1 | 5/2013 | Kirshenbaum | |
| 2013/0110847 A1 | 5/2013 | Sahuguet et al. | |
| 2013/0125211 A1* | 5/2013 | Cashman et al. | 726/4 |

OTHER PUBLICATIONS

Shyu, C-R., GeoIRIS: Geospatial Information Retrieval and Indexing System—Content Mining, Semantics Modeling, and Complex Queries, IEEE Trans Geosci Remote Sens., Apr. 2007, pp. 839-852, vol. 45, No. 4.

Adler, T., et al., "Reputation Systems for Open Collaboration," Communications ACM, Aug. 2011 vol. 54, No. 8, pp. 81-87.

Dyer, J., et al., "Consensus decision making in human crowds," Animal Behaviour, 2008, pp. 461-470, vol. 75.

Gupta, S., et al., "A Framework for Secure Knowledge Management in Pervasive Computing," In Proceedings of the Workshop on Secure Knowledge Management, Nov. 3-4, 2008, Dallas, Texas, 7 Pages.

Welinder, P., et al., "Online crowdsourcing: Rating annotators and obtaining cost-effective labels," 2010 IEEE Computer Society Computer Vision and Pattern Recognition Workshops (CVPRW), Jun. 13-18, 2010, San Francisco, pp. 25-32.

* cited by examiner

USING MOBILE APPLICATION LOGS TO MEASURE AND MAINTAIN ACCURACY OF BUSINESS INFORMATION

BACKGROUND

1. Field of Disclosure

The disclosure generally relates to the field of data processing, in particular to measuring data accuracy of and updating business information in online business information systems.

2. Description of the Related Art

Information about business entities is available online from aggregate information sources such as business directories. The quality of the business information varies drastically from source to source. Currently, the accuracy and up-to-dateness of business information provided by an aggregate information source is measured primarily based on human belief in the quality of the source of the data. This approach is both unreliable and over-general.

SUMMARY

The accuracy of business information about various business entities is measured using information acquired from mobile application logs. One aspect of the present disclosure is a computer-implemented method for updating business information, comprising: receiving user activity logs from a plurality of mobile devices of a plurality of different users, the user activity logs containing user activity information; identifying a plurality of user activity logs relating to a business based at least in part on a first attribute of the business; extracting a value for a second attribute of the business from the identified plurality of user activity logs and computing a confidence score for the extracted value of the second attribute; and updating a store of business information for the business entity based at least in part on the confidence score for the extracted value of the second attribute.

Another aspect of the present disclosure is a computer system for updating business information, comprising: a non-transitory computer-readable storage medium comprising executable computer program code for: receiving user activity logs from a plurality of mobile devices of a plurality of different users, the user activity logs containing user activity information; identifying a plurality of user activity logs relating to a business based at least in part on a first attribute of the business; extracting a value for a second attribute of the business from the identified plurality of user activity logs and computing a confidence score for the extracted value of the second attribute; and updating a store of business information for the business entity based at least in part on the confidence score for the extracted value of the second attribute; and a processor for executing the executable computer program code.

A third aspect of the present disclosure is a non-transitory computer-readable storage medium storing executable computer program instructions for updating business information, the computer program instructions comprising instructions for: receiving user activity logs from a plurality of mobile devices of a plurality of different users, the user activity logs containing user activity information; identifying a plurality of user activity logs relating to a business based at least in part on a first attribute of the business; extracting a value for a second attribute of the business from the identified plurality of user activity logs and computing a confidence score for the extracted value of the second attribute; and updating a store of business information for the business entity based at least in part on the confidence score for the extracted value of the second attribute.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Computing Environment

Figure 1:
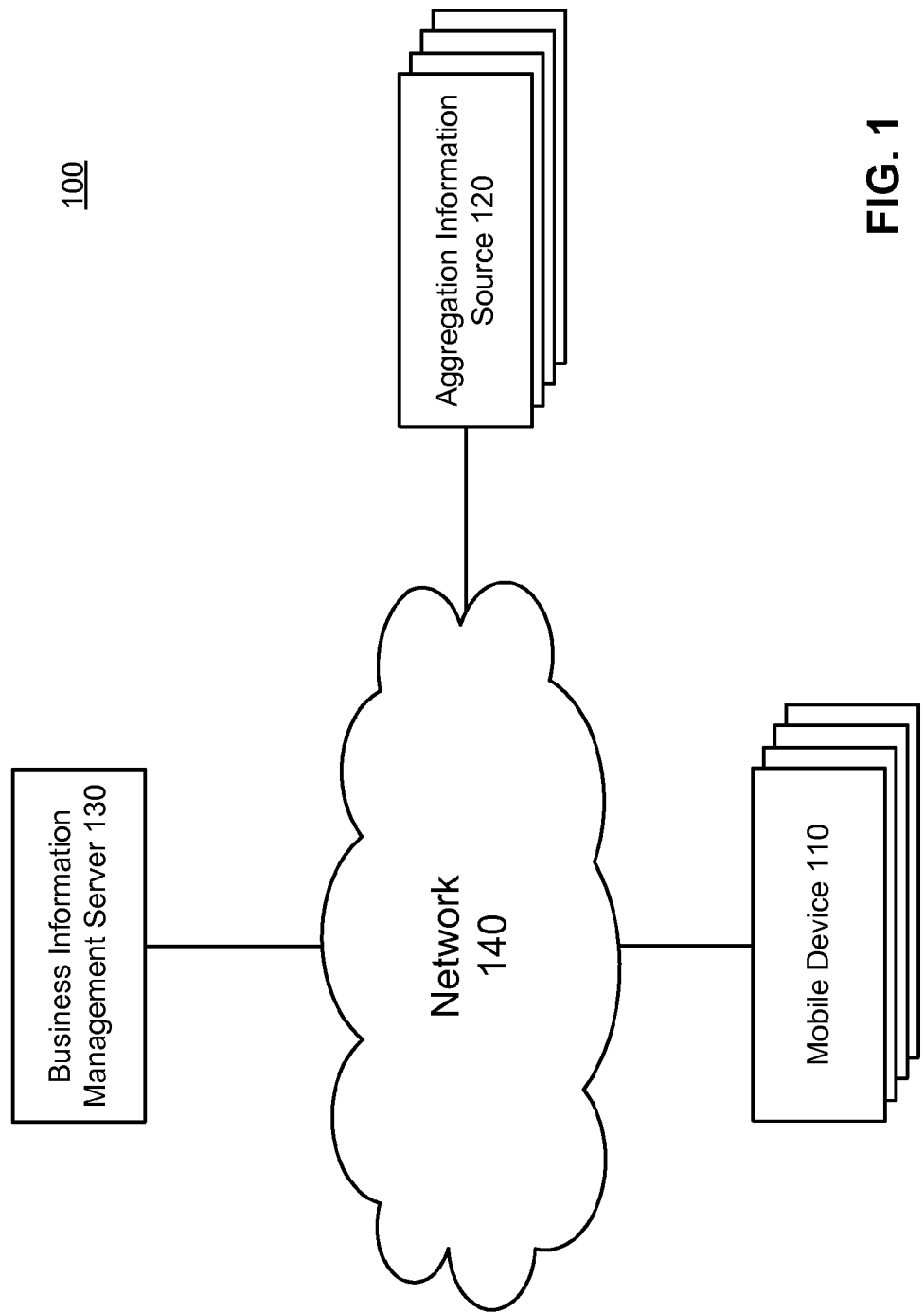
FIG. 1 is a high-level block diagram of a computing environment according to one embodiment of the present disclosure.

FIG. 1 is a high-level block diagram that illustrates a computing environment 100 for measuring the accuracy of business information and updating outdated business information based on information about user activities collected from mobile devices, according to one embodiment of the present disclosure. As shown, the computing environment 100 includes mobile devices 110, aggregate information sources (also called "sources") 120, and a business information management server 130, all connected through a network 140. There can be other entities in the computing environment 100.

A mobile device 110 is a portable electronic device with computing capabilities. An example mobile device 110 is a mobile telephone executing, for example, a Google Android operating system (OS). Other examples of the mobile device 110 include a mobile computer system (e.g., a tablet computer) executing, for example, a Microsoft Windows-compatible OS, Apple OS X, and/or a Linux distribution, and a device having computer functionality, such as a personal digital assistant (PDA). The mobile device 110 executes one or more applications to perform various activities, such as placing a telephone call and transmitting a message to a server (e.g., a web server) or to another mobile device 110. Examples of the applications include a telephone application and a business information application that provides information about businesses, such as restaurants, banks, retail stores, service companies, professionals, and the like, and allows users to comment and rate such businesses. In addition, the mobile device 110 includes one or more on-device components (e.g., a global navigation satellite system receiver, such as a GPS receiver) that generate additional information related to the location of the mobile device 110, such as its latitude/longitude, bearing, speed, and the like. FIG. 1 shows only a single mobile device 110, however in practice there will be many such devices in use (thousands or even hundreds of thousands or more).

In one embodiment, a mobile device 110 records information about the activities performed by the applications (also called "mobile application logs"), and periodically transmits the mobile application logs to the business information management server 130. In one embodiment, mobile device 110 notifies users of the types of information that are stored in mobile applications logs and transmitted to business information management server 130, and provides the user the opportunity to opt-out of having such information collected and/or shared with business information management server 130. In one embodiment, business information management server 130 suitably anonymizes any information shared by mobile device 110 prior to utilizing the information. The collection and transmission of mobile application logs can be performed by either the OS or by a client application. For example, the OS of a mobile device 110 may interact with a telephone application running on the mobile device 110 through a supported application programming interface (API) to retrieve information related to different aspects of a placed telephone call such as the time the call is initiated, the time the recipient telephone starts ringing, the time the call is connected, and the time the call is disconnected, the length of the call, and store this information in one mobile application log.

As another example, the OS of a mobile device 110 may interact with the business information application to retrieve information related to a review message the user submitted in regards to a business, such as the name of the subject business entity, the content of the review, the geographic location of the mobile device 110 where the review message is submitted, and the time when the review message is submitted, and then store the retrieved information in a mobile application log. The different aspects of an activity are stored in different fields of a mobile application log for that activity. The OS then transmits the recent mobile application logs (e.g., within a 24-hour period) to the business information management server 130 periodically (e.g., at midnight).

The aggregate information sources 120 provide business information about various business entities. The business information includes values of attributes such as business names, telephone numbers, geographic locations (e.g., addresses, longitudes and latitudes), business hours, description of services and products, customer reviews and ratings, and so forth. Examples of the aggregate information sources 120 include business directory websites and business review websites. The aggregate information sources 120 gather the business information from sources such as business mailing lists, government records, the official websites of business entities, and user inputs.

The business information management server (also called the "server") 130 retrieves and/or extracts business information about various business entities from multiple aggregate information sources 120, and receives mobile application logs from the various mobile devices 110 used by a large number of users. For example, in a major metropolitan area such as San Francisco or New York, the server 130 may receive tens of thousands of mobile application logs every 24 hours. The server 130 measures the accuracy of the business information stored for a given business entity based on the information received in these mobile applications logs, and generates a collection of updated business information based on the accuracy measures.

In order to measure the accuracy of stored business information about a business entity, the server 130 identifies activities that are related to the business entity (e.g., telephone calls made to a listed telephone number of the business entity, emails sent to or received from a listed email address of the business entity, messages transmitted from a mobile device when the mobile device was proximate to a listed location of the business entity), extracts information about the business entity from mobile applications logs of the identified activities, and compares the stored business information and the extracted information for matches. The server 130 updates the stored business information for the various business entities based on the information extracted from the related activities. In one embodiment, the server 130 provides a web-based business search functionality that provides users with accurate and up-to-date business information of business entities in search results.

The network 140 enables communications among the mobile devices 110, the aggregate information sources 120, and the business information management server 130. In one embodiment, the network 140 uses standard communications technologies and/or protocols. Thus, the network 140 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 140 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 140 can also include links to other networks such as the Internet.

Computer Architecture

Figure 2:
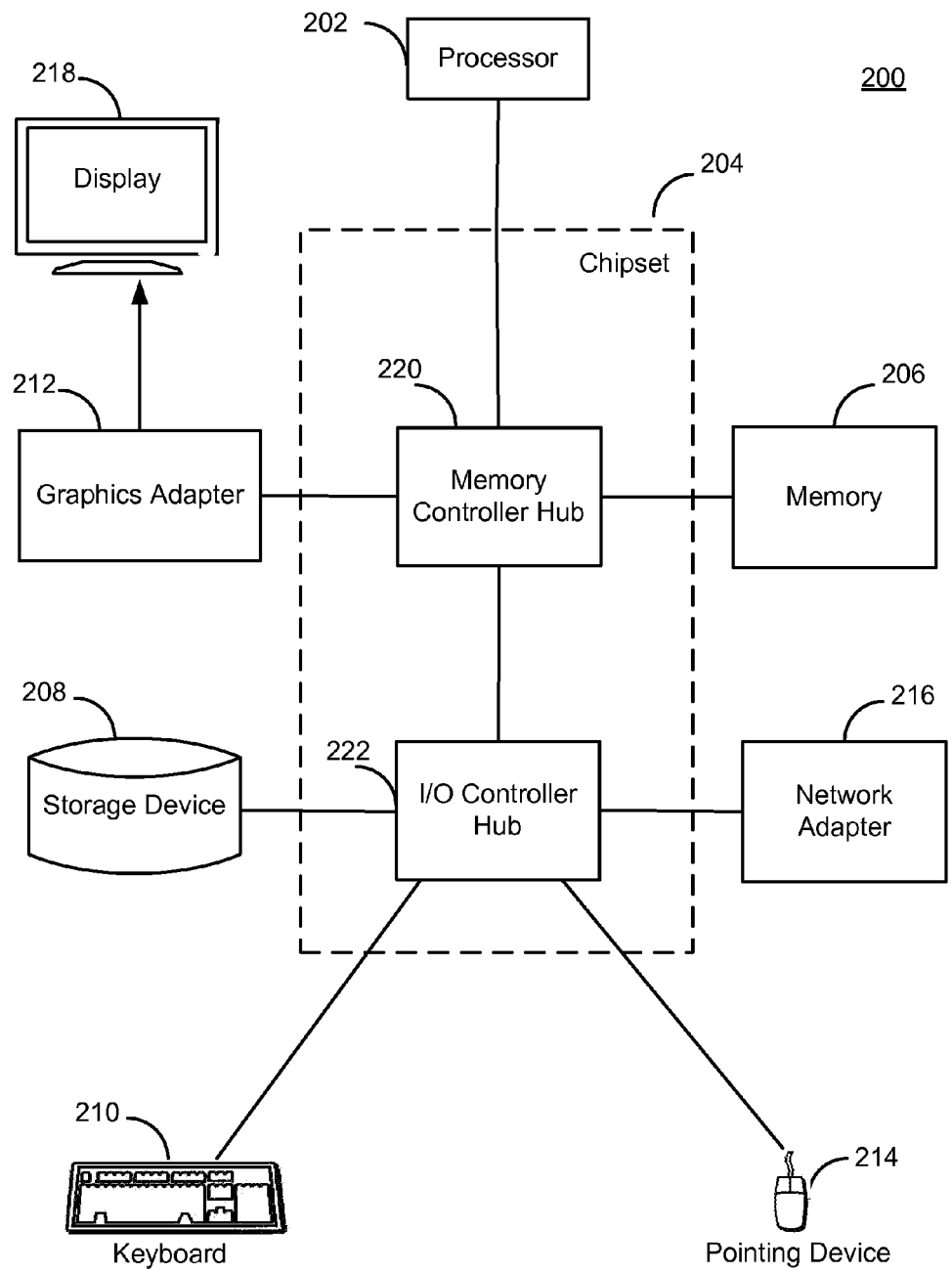
FIG. 2 is a high-level block diagram illustrating an example of a computer for use in the computing environment shown in FIG. 1 according to one embodiment of the present disclosure.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the business information management server 130 might comprise multiple blade servers working together to provide the functionality described herein. The computers 200 can lack some of the components described above, such as keyboards 210, graphics adapters 212, and displays 218. In addition, one or more of the functions of the business information management server 130 can also be executed in a cloud computing environment. As used herein, cloud computing refers to a style of computing in which dynamically scalable and often virtualized resources are provided as a service over the Internet.

Example Architectural Overview of the Business Information Management Server

Figure 3:
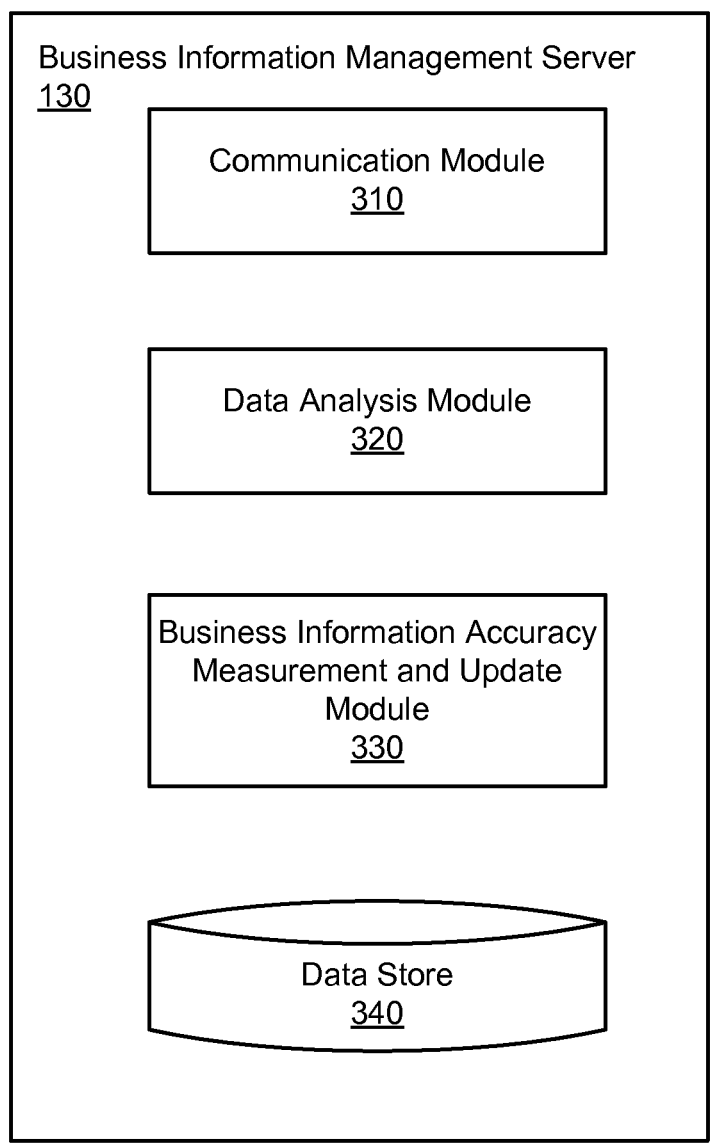
FIG. 3 is a high-level block diagram illustrating modules within a business information management server according to one embodiment of the present disclosure.

FIG. 3 is a high-level block diagram illustrating a detailed view of modules within the business information management server 130 according to one embodiment. Some embodiments of the server 130 have different and/or other modules than the ones described herein. Similarly, the functions can be distributed among the modules in accordance with other embodiments in a different manner than is described here. As illustrated, the server 130 includes a communication module 310, a data analysis module 320, a business information accuracy measurement and update module 330, and a data store 340.

The communication module 310 communicates with multiple mobile devices 110 to retrieve mobile application logs about activities performed thereon. In addition, the communication module 310 communicates with multiple aggregate information sources 120 to retrieve business information about various business entities. Additionally or alternatively, the communication module 310 receives the business information from the aggregate information sources 120 (e.g., uploaded by the aggregate information sources 120 to a website hosted by the communication module 310).

The data analysis module 320 analyzes the mobile application logs to recognize instances of business entities appearing in the application logs. The data analysis module 320 identifies business entities appearing in the mobile application logs by matching information in the mobile application logs with business information about various business entities. Depending on factors such as the nature of the mobile application performing the activity recorded in the mobile application log (e.g., a telephone application versus a review posted in the business information application), the nature of the activity (e.g., a telephone call versus a review), the data analysis module 320 compares different fields of the mobile application log with different attribute values of the business information to identify matches.

For example, for a mobile application log associated with a telephone application, the data analysis module 320 compares the destination telephone number of the telephone call with the stored telephone numbers of business entities, and identifies a business entity with a matching telephone number as the business entity related to the telephone call.

As another example, for a mobile application log for a business information application regarding a user review of a business, the data analysis module 320 compares the name of the subject business entity with the names of stored business entities, and identifies a business entity with a matching business name as the business entity related to the review message. In one embodiment, in order to enhance efficiency, the data analysis module 320 only compares information in the mobile application logs with information about business entities that are located within a predetermined radius around the device location where the activity took place (e.g., within 10 miles).

The data analysis module 320 may identify and extract information from the mobile application logs such as telephone numbers and business names using various technologies such as pattern matching, tag recognition, and/or natural language processing. The data analysis module 320 may also compare the extracted information with stored business information to identify related business entities. The data analysis module 320 may normalize the extracted information (e.g., by removing symbols such as "(", ")", and "-" from telephone numbers, converting uppercase characters in addresses into corresponding lowercase characters) before conducting the comparisons. The information extracted from a mobile application log, hereinafter called the instance data of that mobile application log, is stored along with the identity of a business entity related to that instance data.

The data analysis module 320 processes the instance data by applying a set of data analysis rules for measuring the accuracy of the business information to be found in the instance data. Given the instance data, the module 320 generates scored instance attributes for the business entity. A scored instance attribute includes an attribute (e.g., a telephone number, a business location) of the business entity, an attribute value, and a confidence score measuring a confidence in that attribute value. For example, the confidence score can be a continuous value ranging from 0 to 1, with a score of 0 indicating a very low confidence (e.g., the attribute value is probably inaccurate) and a score of 1 indicating a very high confidence (e.g., the attribute value is almost certainly accurate).

A data analysis rule describes a set of operations for extracting a given attribute and attribute value from the instance data, and generating a confidence score for the attribute value. A data analysis rule may be specific to the mobile application logs for certain activities and/or mobile applications, or other conditions. The data analysis rules can be manually created based on observed activity patterns, automatically generated by applying machine learning algorithms to a training corpus, or a combination of both.

In order to filter out abnormal user activities (e.g., spam review messages), data analysis rules are generally applied to multiple mobile application logs received from multiple mobile devices 110. For example, a "business location rule" may perform the following operations:

identify review messages for a selected business entity appearing in the logs from multiple different users;
identify the locations (e.g., latitudes and longitudes provided by on-device GPS receivers) of the mobile devices 110 where each review message was generated;
identify a geographic location proximate to a majority of the device locations as a probable business location of the business entity.

The foregoing business location rule is based on the premise that users tend to submit business reviews using their mobile devices 110 while in or near the subject business entities. If a majority of the reviews of a business entity were submitted in geographic locations near each other, then such locations are likely proximate to the business location and thus can be used to infer (or confirm) the business location.

Another example data analysis rule infers a business schedule (e.g., the operating hours for the business) based on the times when the review messages were sent. This rule is based on the premise that users tend to submit reviews at, or shortly after, the time they visit a business. From the overall distribution of review times, the data analysis rule can infer the most likely times and/or days of week that the business operates.

In addition to inferring different types of attributes and attribute values, the data analysis module 320 can also generate a confidence score for each attribute value. The confidence score for an attribute value may be determined based on factors such as the number of mobile application logs or data instances from which the attribute value is inferred. For example, the larger the number of mobile application logs an attribute value is acquired from, the higher the confidence score for that attribute value.

A third example of a data analysis rule is a rule that measures the likelihood of a telephone number being an operating telephone number based on the durations of calls made to the telephone number. In this case, the data analysis module 320 identifies instances of telephone calls made to a selected business entity, and the duration of each call. The data analysis module 320 generates a histogram or other distribution of call durations, for example tabulating calls between 0-15 seconds, 15-30 seconds, 30-60 seconds, and so forth. If most calls are longer than a threshold value (e.g., 30 seconds), the rule assigns a high confidence score (or boosts an existing confidence score) for the value of the telephone number. Otherwise, if most of the calls do not connect or have very short durations, then the inference is that the telephone number is not a valid number for the business (e.g., wrong telephone number, disconnected number), and the rule assigns a low confidence score (or reduces an existing confidence score) for the value of the telephone number.

Because the communication module 310 periodically (e.g., daily) receives up-to-date mobile application logs, the data analysis rules can be periodically applied to obtain and/or maintain up-do-date business information. For example, the business location rule can be periodically applied to up-to-date mobile application logs to obtain and/or maintain up-to-date business location information and to track business location changes based on up-to-date information on the location of devices providing reviews of the business.

The business information accuracy measurement and update module 330 ("update module") measures the accuracy of stored business information retrieved from the aggregate information sources 120, and updates the business information based on the information retrieved from the mobile application logs. Business information about a business entity includes values of various attributes of the business entity. The update module 330 measures the accuracy and up-to-dateness of stored business information by determining accuracy scores for the stored business information. The accuracy score for a stored quantum of business information can be based on the confidence score of the corresponding scored instance attribute determined from the mobile applications logs. In one embodiment, the accuracy score is the same as the confidence score.

In addition to the scored instance attribute information acquired from the mobile application logs, the update module 330 may take into account other factors in determining the accuracy score for the stored quantum of business information. For example, the update module 330 may compare the stored quantum of business information with information extracted from the official website of the associated business entity, and boost/reduce the accuracy score for that stored quantum of business information if they match/mismatch.

The update module 330 updates stored business information and adds new business information about business entities based on scored instance attributes (i.e., attributes, attribute values, and confidence scores) acquired from the mobile application logs. The update module 330 updates the stored business information by replacing stored attribute values with low accuracy scores (e.g., lower than a threshold value) with corresponding instance attribute values (i.e., obtained from the mobile application logs) having higher confidence scores or having confidence scores that are higher than a threshold value. In addition, if a quantum of stored business information from the aggregate information sources 120 is missing, the update module 330 adds the corresponding instance attribute value obtained from the mobile application logs if the confidence score for that instance attribute value is high (e.g., higher than a threshold value), and sets the accuracy score for the stored quantum of business information equal to the confidence score.

Because the scored instance attributes acquired from the mobile application logs are based on recent user activities and are cycled rapidly (e.g., daily), the information is likely to be more accurate and up-to-date than the stored business information provided by the aggregate information sources 120, which is typically updated on much longer time scales (e.g., every six months). Accordingly, the scored instance attributes obtained from the mobile application logs can be used to measure the accuracy of the corresponding stored business information (e.g., telephone numbers, addresses) received from the aggregate information sources 120 and/or to update the stored business information.

The update module 330 can provide a service, such as a local business search service or a mapping service, with accurate and up-to-date business information. The update module 330 uses the accuracy scores as a measure of the accuracy and up-to-dateness of the stored business information, and can provide users with the most accurate and up-to-date stored business information.

The data store 340 stores data used by the business information management server 130. Examples of such data include business information retrieved from the aggregate information sources 120, mobile application logs received from the mobile devices 110, data analysis rules, scored attributes acquired from the mobile application logs, and accuracy scores, to name a few. The data store 340 may be a relational database or any other type of database.

Overview of Methodology for the Business Information Management Server

Figure 4:
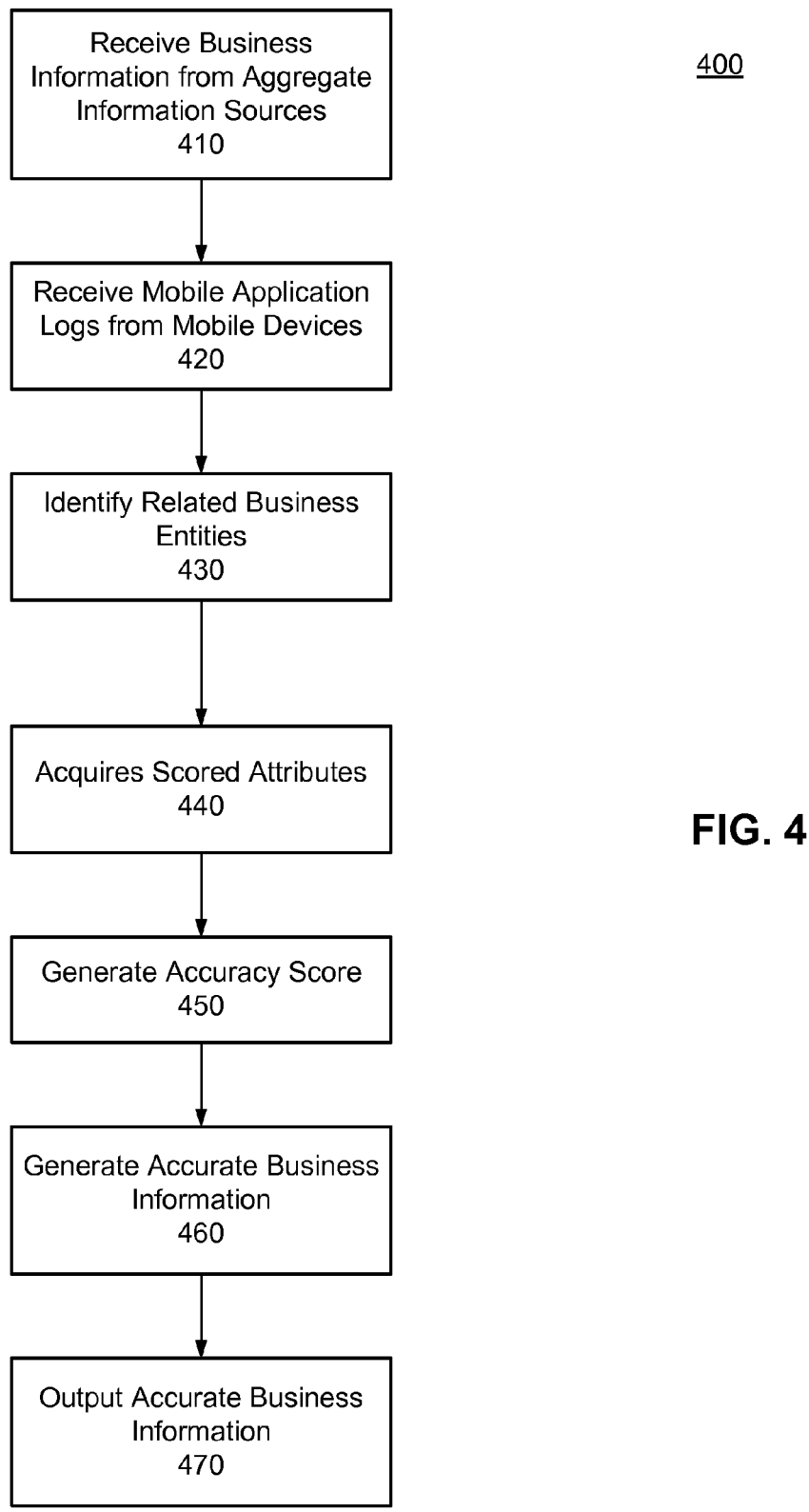
FIG. 4 is a flow diagram illustrating a process for measuring the accuracy of business information about various business entities based on information acquired from mobile application logs, according to one embodiment of the present disclosure.

FIG. 4 is a flow diagram illustrating a process 400 for the business information management server 130 to measure the accuracy of stored business information about various business entities based on scored instance attributes acquired from mobile application logs, according to one embodiment. Other embodiments can perform the steps of the process 400 in different orders. Moreover, other embodiments can include different and/or additional steps than the ones described herein, can combine two or more steps described herein into a single step, or can divide a single step described herein into two or more steps.

The server 130 receives and stores 410 business information about various business entities from the aggregate information sources 120 and receives 420 the mobile application logs from a plurality of mobile devices 110. In a typical embodiment, the server 130 receives thousands, potentially tens or hundreds of thousands of logs during each update cycle. The mobile logs describe different aspects of user activities that took place on the various mobile devices 110 since the previous update. The server 130 identifies 430 business entities related to the user activities by matching and/or identifying business information with information in the mobile application logs, and acquires 440 scored instance attributes (attributes, attribute values and confidence scores) for the business entities by applying applicable data analysis rules to the data in the mobile application logs (e.g., telephone call histories).

The server 130 determines 450 accuracy scores for the stored business information obtained from the aggregate information sources 120 based on the confidence scores determined for the corresponding scored instance attributes obtained from the mobile application logs, and selectively updates 460 the stored business information based on the accuracy and confidence scores. At some subsequent point, the server 130 outputs 470 the stored business information to users as requested. The output can be presented in various forms, for example on a web page, in a client application, on a mobile device through a client application, in electronic business card format (e.g., vCard in RFC 2426, hCard, and the like).

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for measuring the accuracy of business information about various business entities using scored attributes acquired from mobile application logs. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for updating business information, comprising:
    receiving mobile application logs from a plurality of mobile devices of a plurality of different users, a mobile application log comprising a history of telephone calls involving a mobile device and a value for an attribute of a business entity;
    matching the value for the attribute in the mobile application log with a stored attribute value of a stored business entity, the stored business entity missing a value for a second attribute;
    inferring from the mobile application logs the value for the second attribute of the business entity;
    identifying in the mobile application logs a plurality of telephone calls between the mobile devices and the business entity;
    extracting from the mobile application logs durations for the identified plurality of telephone calls;
    computing a confidence score for the value for the second attribute based on the durations, the computing comprising:
        generating a statistical distribution describing the durations of the identified plurality of telephone calls;
        analyzing the statistical distribution to determine whether most of the identified plurality of telephone calls have durations longer than the threshold; and
        assigning a high confidence score to the value for the second attribute responsive to most of the identified plurality of telephone calls having a durations longer than the threshold; and
    updating a store of business information for the business entity with the value for the second attribute responsive to the confidence score exceeding a threshold.

2. The method of claim 1 wherein matching the value for the attribute in the mobile application log with a stored attribute value of a stored business entity comprises:

determining a location of one of the plurality of mobile devices associated with one of the mobile application logs at a time that the value for the attribute was captured in the mobile application log associated with the one of the plurality of mobile devices; and matching the value for the attribute with a stored attribute value of a stored business entity located within a threshold distance from the location of the mobile device.

3. The method of claim 1 wherein the attribute comprises a phone number.

4. The method of claim 1 wherein the second attribute comprises operating hours of the business entity.

5. The method of claim 1 wherein the second attribute comprises a location of the business entity.

6. A computer system for updating business information, comprising:
- one or more processors for executing program code; and
- a non-transitory computer-readable storage medium comprising executable computer program code for:
  - receiving mobile application logs from a plurality of mobile devices of a plurality of different users, a mobile application log comprising a history of telephone calls involving a mobile device and a value for an attribute of a business entity;
  - matching the value for the attribute in the mobile application log with a stored attribute value of a stored business entity, the stored business entity missing a value for a second attribute;
  - inferring from the mobile application logs the value for the second attribute;
  - identifying in the mobile application logs a plurality of telephone calls between the mobile devices and the business entity;
  - extracting from the mobile application logs durations for the identified plurality of telephone calls;
  - computing a confidence score for the value for the second attribute based on the durations, the computing comprising:
    - generating a statistical distribution describing the durations of the identified plurality of telephone calls;
    - analyzing the statistical distribution to determine whether most of the identified plurality of telephone calls have durations longer than the threshold; and
    - assigning a high confidence score to the value for the second attribute responsive to most of the identified plurality of telephone calls having a durations longer than the threshold; and
  - updating a store of business information for the business entity with the value for the second attribute.

7. The system of claim 6 wherein matching the value for the attribute in the mobile application log with a stored attribute value of a stored business entity comprises:
- determining a location of one of the plurality of mobile devices associated with one of the mobile application logs at a time that the value for the attribute was captured in the mobile application log associated with the one of the plurality of mobile devices; and
- matching the value for the attribute with a stored attribute value of a stored business entity located within a threshold distance from the location of the mobile device.

8. The system of claim 6 wherein the attribute comprises a phone number.

9. The system of claim 6 wherein the second attribute comprises a location of the business entity.

10. The system of claim 6 wherein the second attribute comprises operating hours of the business entity.

11. A non-transitory computer-readable storage medium storing executable computer program instructions for updating business information, the computer program instructions comprising instructions for:
- receiving mobile application logs from a plurality of mobile devices of a plurality of different users, a mobile application log comprising a history of telephone calls involving a mobile device and a value for an attribute of a business entity;
- matching the value for the attribute in the mobile application log with a stored attribute value of a stored business entity, the stored business entity missing a value for a second attribute;
- inferring from the mobile application logs the value for the second attribute;
- identifying in the mobile application logs a plurality of telephone calls between the mobile devices and the business entity;
- extracting from the mobile application logs durations for the identified plurality of telephone calls;
- computing a confidence score for the value for the second attribute based on the durations, the computing comprising:
  - generating a statistical distribution describing the durations of the identified plurality of telephone calls;
  - analyzing the statistical distribution to determine whether most of the identified plurality of telephone calls have durations longer than the threshold; and
  - assigning a high confidence score to the value for the second attribute responsive to most of the identified plurality of telephone calls having a durations longer than the threshold; and
- updating a store of business information for the business entity with the value for the second attribute.

12. The non-transitory computer-readable storage medium of claim 11 wherein matching the value for the attribute in the mobile application log with a stored attribute value of a stored business entity comprises:
- determining a location of one of the plurality of mobile devices associated with one of the mobile application logs at a time that the value for the attribute was captured in the mobile application log associated with the one of the plurality of mobile devices; and
- matching the value for the attribute with a stored attribute value of a stored business entity located within a threshold distance from the location of the mobile device.

13. The non-transitory computer-readable storage medium of claim 11 wherein the attribute comprises a phone number.

14. The non-transitory computer-readable storage medium of claim 13 wherein the second attribute comprises operating hours of the business entity.

* * * * *